United States Patent
Noguchi et al.

(10) Patent No.: US 6,244,074 B1
(45) Date of Patent: Jun. 12, 2001

(54) METHOD OF MANUFACTURING GLASS PLATE WITH LIGHT-TRANSMISSIVE COLORED FILM

(75) Inventors: Tatsuya Noguchi; Hideki Okamoto; Takashi Muromachi, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/218,339

(22) Filed: Dec. 22, 1998

(30) Foreign Application Priority Data

Dec. 25, 1997 (JP) .................................................. 9-356748

(51) Int. Cl.$^7$ .............................. C03B 8/02; C03C 17/25; C03C 17/34
(52) U.S. Cl. .................. 65/17.2; 65/60.51; 65/60.52; 65/60.2
(58) Field of Search ..................................... 65/17.2, 60.3, 65/60.5, 60.52, 60.51, 60.2

(56) References Cited

U.S. PATENT DOCUMENTS

| | | | | |
|---|---|---|---|---|
| 4,476,156 | * | 10/1984 | Brinker et al. | 427/82 |
| 5,112,676 | * | 5/1992 | Cot et al. | 427/226 |
| 5,403,368 | * | 4/1995 | Takahashi et al. | 65/17.2 |
| 5,413,865 | * | 5/1995 | Nakamura et al. | 428/432 |
| 5,693,404 | | 12/1997 | Shiraishi et al. | 428/156 |
| 5,817,160 | * | 10/1998 | Nagpal et al. | 65/17.3 |
| 5,837,025 | * | 11/1998 | Auchter-Krummel et al. | 65/21.1 |
| 5,976,678 | * | 11/1999 | Kawazu et al. | 428/208 |

FOREIGN PATENT DOCUMENTS

| | | | |
|---|---|---|---|
| 58-185441 | * | 10/1983 | (JP) . |
| 3-28133 | * | 2/1991 | (JP) . |
| 5-9406 | | 1/1993 | (JP) . |
| 7-24610 | * | 9/1995 | (JP) . |
| 08104543 | | 4/1996 | (JP) . |
| 08104546 | | 4/1996 | (JP) . |
| 08337438 | | 12/1996 | (JP) . |
| 09118543 | | 5/1997 | (JP) . |
| 09169546 | | 6/1997 | (JP) . |
| WO 89/02869 | | 4/1989 | (WO) . |

OTHER PUBLICATIONS

Derwent WPI, Week 198649, AN 1986–320864, ES 8606215A, abstract, Oct. 1986.*
Journal of Non–Crystalline Solids 82 pp. 378–390, Section VI, Coatings II, Coloured Coating Prepared by the Sol–Gel Process; F. Orgaz and H. Rawson; North–Holland Physics Publishing Division 1986 (No month available).
Thin Film Coating Technology by Sol Gel Method; Feb. 4, 1994, Kazuhiro Takahasi; Technical Information Association Co., Ltd.

\* cited by examiner

*Primary Examiner*—Sean Vincent
(74) *Attorney, Agent, or Firm*—Merchant & Gould P.C.

(57) ABSTRACT

There is provided a method of manufacturing a glass plate with a light-transmissive colored film using a coating solution including a metal salt and a metal alkoxide, the light-transmissive colored film having a coloring effect due to a metal oxide which will not be impaired even if the amount of the added metal alkoxide is increased, and being highly resistant to wear and chemicals. A method of manufacturing a glass plate with a light-transmissive colored film comprises the steps of hydrolyzing and polymerizing a metal alkoxide to form a hydrolyzed polymeric product, aging the hydrolyzed polymeric product to achieve a weight-average molecular weight no less than 3000 based on polystyrene, preparing a coating solution including the hydrolyzed polymeric product, a metal salt as a coloring component, and a solvent, coating the coating solution on a surface of a glass plate, preliminarily firing the glass plate to convert the hydrolyzed polymeric product into a porous gel, and firing the glass plate to vitrify the porous gel and thermally decompose the metal salt into an oxide.

15 Claims, No Drawings

METHOD OF MANUFACTURING GLASS PLATE WITH LIGHT-TRANSMISSIVE COLORED FILM

TECHNICAL FIELD

The present invention relates to a method of manufacturing a glass plate with a light-transmissive colored film having absorbing characteristics in a visible light range, and more particularly to a method of manufacturing a glass plate with a light-transmissive colored film having a reflectance and a reflected color tone which are useful for automobile window glass.

BACKGROUND ART

Oxides of transition metals are known as inorganic materials having characteristic absorption properties in the visible light range. According to the absorption principles of these oxides, when oxygen is coordinated with a transition metal, the d orbitals of the transition metal are divided into some energy levels. The electron transition energy in the orbital is 1–3 eV. Since this electron transition energy overlaps the light energy in the visible light range, the oxide causes characteristic coloring in the visible light range. A composite oxide composed of two or more transition metals is considered to absorb light in the visible light range based on the same principles.

Industrial applications of colored films made of such oxides include glass products comprising a transparent glass plate covered with a colored film to lower the transmittance of visible light for giving automobile and house windows a privacy protection capability, and glass products which block solar radiation to cut off heat radiation and ultraviolet radiation. Since these glass products are used in house, building, and automobile windows, they require colored films of highly durable properties including wear resistance, chemical resistance, etc.

Such colored films are fabricated by vacuum evaporation, sputtering, etc. These dry processes need a highly expensive vacuum system. Many automobile window glasses are bent to meet design requirements. Such glass plates as industrial products do not lend themselves to being applied to substrates in such dry processes.

One simple process for fabricating a thin film inexpensively without the need for an expensive system is a thermal decomposition process in which a material such as a metal salt is dissolved in a solvent to prepare a solution, the solution is applied to a substrate, and heat-treated at a high temperature to produce a metal oxide film. While this process is capable of fabricating an inexpensive colored film, the colored film produced does not have sufficient wear resistance, chemical resistance, etc. from practical standpoints.

There have been proposed a coating solution for manufacturing a colored film, the coating solution being a combination of the solution of the metal salt according to the thermal decomposition process and a metal alkoxide added thereto that is vitrified by a sol-gel process, and a process for manufacturing a colored film (see J. Non-Crystalline Solids, 82, (1986), pages 378–390).

Specifically, a film of an oxide of Si, for example, which is highly wear-resistant and chemical resistant, is prepared by the sol-gel process, and a transition metal which is present as a coloring component in the oxide film is converted into an oxide by the thermal decomposition process. A coating solution is prepared by dissolving nitrates or sulfates of several transition metals as a coloring component into a solvent according to the intended purpose, and an Si alkoxide, for example, is added to the coating solution and mixed therewith. The mixed solution of the metal salt solution and the hydrolyzed alkoxide is coated on a substrate. When the coated solution is heated, a porous gel having a molecular structure of Si —O—Si is produced. When the coated solution is further heated, the transition metal ions present in the porous gel are crystallized with the heat and separated into an oxide which serves as a coloring component. The gel is further baked into a rigid silica film. As a result, a silica glass film colored with the transition metal oxide is produced as a colored film which is resistant to wear and chemicals.

Japanese laid-open patent publication No. 9-169546 discloses the following details: This publication states, as a problem with the above proposal, that when a silicon alkoxide or the like other than the coloring component is added to make the film sufficiently durable, the absorbance is lowered, and the film needs to be thickened in order to achieve a necessary reduction in the transmittance.

The publication discloses in claim 1 thereof a coating solution for forming an oxide film, including at least one metal salt selected from the group consisting of Co, Cr, Mn, Fe, Ni, Cu, Zn and a lanthanoid, and an ethylene glycol oligomer.

The publication discloses in claim 3 thereof that an alkoxide or chelate of at least one metal selected from the group consisting of Si, Ti, and Zr is contained in the above coating solution.

The publication discloses in example 14 thereof a coating solution comprising Co, Mn, and SiOR, in example 15 thereof a coating solution comprising Co, Fe, and ZrOR, and in example 16 thereof a coating solution comprising Co, Ni, and TiOR.

Each of the films obtained from those examples has a brownish transparent film appearance similar to a half-silvered mirror, and has a reflectance ranging from 20% to 35%. The publication states that the haze value, adhesion, and chemical resistance of the films obtained are good.

The publication discloses in example 21 thereof a coating solution comprising Cu, Mn, and SiOR, in example 22 thereof a coating solution comprising Cu, Mn, Co, and SiOR, and in example 24 thereof a coating solution comprising Cu, Mn, Co, Cr, and SiOR.

Each of the films obtained from those examples has a black transparent film appearance, and has a reflectance of 8%. The publication states that the haze value, adhesion, and chemical resistance of the films obtained are good.

Glass is manufactured according to the sol-gel process as follows: A metal alkoxide is hydrolyzed and then polymerized into a three-dimensional network of metal atoms and oxygen atoms. The reaction is continued to turn the network into a porous gel, which is then heated to produce glass and a polycrystalline oxide.

One of the features of the sol-gel process is that it is capable of synthesizing glass at a low temperature. Particularly, silica glass synthesized at a low temperature from an Si alkoxide is widely used as hard coating films on surfaces of plastic products, etc.

Several colored films produced according to the sol-gel process have been proposed in the art.

For example, Japanese laid-open patent publication No. 5-9406 proposes a colored glass gel thin film containing a metal alkoxide, a condensed polymer of a metal alkoxide, a dye, an alcohol solvent, and a compatible dispersant. The dye has a particle diameter ranging from 300 to 20000 nm, and may comprise a metal oxide as an inorganic pigment.

According to Japanese laid-open patent publication No. 5-9406, the particle diameter of the dye needs to be adjusted to keep the colored glass gel thin film transparent.

It may be possible to form a colored film directly using an alkoxide of a transition metal. While alkoxides of Si, Ti, Al, Zr, etc. are inexpensive and can be handled relatively easily, alkoxides of transition metals are expensive and mostly cannot be handled with ease. Therefore, forming a colored film directly using an alkoxide of a transition metal would not be a universal and general process for forming a colored film.

In order to increase the wear resistance and chemical resistance in the above proposal according to J. Non-Crystalline Solids, it is necessary to increase the amount of an added metal alkoxide. If the amount of an added metal alkoxide were simply increased, the coloring of the thin film by the metal oxide would be very weakened, the transmittance of the thin film would be increased, and the color tone of the thin film would become yellowish. As a result, a color tone essentially represented by the coloring component would not be achieved.

In each of examples 14, 15, 16 and examples 21, 22, 24 according to Japanese laid-open patent publication No. 9-169546, an alkoxide of at least one metal selected from the group consisting of Si, Ti, and Zr is contained in a coating solution for forming an oxide film, which comprises a metal salt and an ethylene glycol oligomer.

In each of examples 14, 15, 16, a film having a brownish transparent film appearance similar to a half-silvered mirror is produced. In each of examples 21, 22, 24, a film having a black transparent film appearance is produced.

Japanese laid-open patent publication No. 9-169546 discloses nothing about reasons for the different film appearances and detailed film forming conditions.

It is therefore an object of the present invention to provide a method of manufacturing a glass plate with a light-transmissive colored film using a coating solution which is prepared by adding a metal alkoxide as a solution containing metal salts directed to a thermal decomposition process, particularly with the light-transmissive colored film having a coloring effect due to a metal oxide which will not be impaired even if the amount of the added metal alkoxide is increased, and being highly resistant to wear and chemicals.

DISCLOSURE OF THE INVENTION

In order to solve the above problems, the inventors have directed their attention to conditions for hydrolyzing the metal alkoxide, which is a constituent of the coating solution, and the degree of polymerization of the metal alkoxide. As a result of various experimental verifications, the inventors have invented a method of manufacturing a glass plate with a light-transmissive colored film which has sufficient coloring even if the amount of the added metal alkoxide is increased, and which is highly resistant to wear and chemicals.

According to the invention, there is provided a method of manufacturing a glass plate with a light-transmissive colored film, comprising the steps of:

(1) hydrolyzing and polymerizing a metal alkoxide to form a hydrolyzed polymeric product;

(2) aging said hydrolyzed polymeric product to achieve a weight-average molecular weight no less than 3000 based on polystyrene;

(3) preparing a coating solution comprising the aged hydrolyzed polymeric product, a metal salt as a coloring component, and a solvent;

(4) coating said coating solution on a surface of a glass plate;

(5) preliminarily firing the glass plate to convert the hydrolyzed polymeric product into a porous gel; and (6) firing the glass plate to vitrify said porous gel and thermally decompose said metal salt into an oxide.

According to one preferred embodiment of the step of preliminarily firing the glass plate is carried out at a temperature of no more than 300° C.

According to another preferred embodiment of the step of firing the glass plate is carried out at a temperature of no more than the softening point of the glass plate.

In the method of the invention, it is also preferred that said metal alkoxide comprises at least one material selected from the alkoxides of Si, Ti, Al and Zr, and said metal salt comprises salts of Cu and Mn and a salt of at least one metal selected from Fe, Ru, Co, Ni, and Al.

In the further embodiment of the method of the invention, after the application of said coating solution, the glass plate is coated with a solution containing at least one metal alkoxide selected from alkoxides of Si, Ti, Al and Zr substantially in the absence of a coloring component; the coated solution is dried; and thereafter the glass plate is fired.

The present invention resides in that the degree of polymerization of a hydrolyzed polymeric product of a metal alkoxide which is a constituent of a sol-gel component is controlled in order to produce a highly durable colored film using a coating solution which comprises a transition metal salt and a metal alkoxide. By controlling the degree of polymerization, it is possible to increase the amount of the hydrolyzed polymeric product of the alkoxide without lowering the coloring effect of the transition metal oxide, resulting in a glass plate with a light-transmissive colored film which is of increased durability.

The metal salt of Cu, Mn, Fe, Ru, Co, Ni or Al in the coating solution according to the present invention is not limited to any particular materials insofar as they are dissoluble in the solvent of the coating solution. However, nitrates are preferable from the standpoints of the ease of handling and the cost.

The metal salt is dissolved into the solvent to produce a metal salt solution. At this time, the solvent may be heated in order to facilitate dissolving the metal salt.

The solvent of the coating solution and a diluting solution used to adjust the concentration of the coating solution may be of any solutions insofar as they are mutually soluble with respect to the solution of the hydrolyzed polymeric product of the metal alkoxide and the solution in which the metal salt is dissolved, and they can be coated to a uniform thickness. For producing a film to a uniform, irregularity-free finish when it is heated, however, it is preferable to use a solvent having a relatively high boiling point rather than a solvent having a low boiling point such as lower alcohol.

Specifically, the solvent may include diacetone alcohol, N-methyl-2-pyrrolidone (NMP), N,N-dimethylformamide (DMF), dimethylacetamide, ethyl Cellosolve ($C_2H_5OC_2H_4OH$), ethylene glycol, ethylene glycol oligomer, polyethylene glycol #300 (average molecular weight 300), polyethylene glycol #400 (average molecular weight 400) (polyethylene glycols having greater average molecular weights may also be used), propylene glycol, propylene glycol ethyl ether, propylene glycol methyl ether acetate, or the like. These materials may be used singly or at least two of these materials may be mixed with each other.

Solvents other than those described above may be used, and hence the solvent should not be taken as limited to those described above. With respect to the ethylene glycol oligomer, polyethylene glycols classified according to average molecular weight are commercially available, and oligomers having average molecular weights no less than 400 may be used for desired advantageous effect.

The metal alkoxide added to increase the wear resistance and chemical resistance of the film should preferably include an alkoxide of Si, Ti, Al, or Zr from the standpoints of the ease of handling, the cost, the wear resistance, and the chemical resistance. These alkoxides may be used singly or at least two of these alkoxides may be mixed with each other.

An alkoxide is hydrolyzed and polycondensed as follows: A metal alkaxide and alcohol are mixed with each other, and water necessary for hydrolysis is added to the mixture. Then, an acid (or ammonia) as a catalyst is added as an alcohol solution or an aqueous solution to the mixture and mixed therewith, after which the mixture is hydrolyzed and condensed. The water necessary for hydrolysis should preferably be added in a molar amount no less than that of the alkyl group of the alkoxide. The amount of the acid used as a catalyst should preferably be 0.001–0.1 mol per mol of the alkoxide. If the catalyst were added in too an large an amount, then the reaction would proceed too violently to gelation. If the amount of the catalyst were too small, the reaction would be too slow to effect complete hydrolysis.

It would be possible to add a portion of the alkoxide to the coating solution without hydrolyzing the same. However, the alkoxide thus added to the coating solution tends to adversely affect the same such that cissings or stripped irregularities would be produced thereby, when coated. Therefore, the alkoxide should preferably be used after being hydrolyzed.

The hydrolyzed polymeric product of the alkoxide thus produced and the metal salt solution are mixed into the coating solution. As the proportion of the hydrolyzed polymeric product of the alkoxide (hereinafter referred to as a "binder" with respect to the metal ions (ions from the metal salt) in the coating solution is greater, the wear and chemical resistance of the coated film is higher. The greater the amount of the binder, the greater the film thickness with respect to the concentration of metal ions in the same amount, making it easier to control the interference colors of light reflected by the film.

If a large amount of binder were added directly to the metal salt solution, then the coloring of the film would be greatly reduced and the color tone would become yellowish resulting in lacking stability, as described above. In order to achieve stable coloring with a large amount of binder added, the degree of polymerization of the binder may be increased. For example, if a binder of silicate is used, the amount of added binder which will achieve stable coloring can be increased to about 1.5 times of the amount of metal ions, whereby the degree of polymerization of the binder is increased to a weight-average molecular weight (Mw) of 80000 as compared with a hydrolyzed polymeric product of silicate having a Mw of 2500 based on polystyrene.

The reasons why the coloring stability and absorbance of the film are lowered when a large amount of binder is added are not clear, but can be interpreted as follows:

When the coated film is heated, the hydrolyzed polymeric product of the alkoxide of the binder is further polymerized. At this time, the metal ions of the coloring component are considered to be partly entrapped in the network of the hydrolyzed polymeric product of the binder. Even when heated, the metal ions entrapped in the network are not crystallized and separated out as an oxide, but serve to lower the absorbance of the film.

After being heated, the metal ions entrapped in the network remain uncrystallized in the amorphous network, and take a different ion state from the crystallized state. Consequently, the coloring changes, reducing the coloring stability and absorbance of the film in its entirety. When a composite oxide comprising a plurality of metals is produced, if metal ions are entrapped as described above, then a deviation from the desired composition occurs, and stable characteristics cannot be attained.

Therefore, if the amount of the binder added to the metal salt solution is to be increased and a stable oxide as a coloring component is to be produced, then the degree of polymerization of the hydrolyzed polymeric product of the binder may be increased. When the degree of polymerization is increased, the number of end groups of the network is reduced, reducing the amount of metal ions entrapped in the network. Consequently, even if the amount of an added binder is increased, a film having stable absorbance and coloring capability can be produced.

The degree of polymerization of the binder may be increased in any manner and the process of effecting such polymerization is not limited to a particular process. General processes include increasing the reaction temperature of polymerization, prolonging the reaction time, and increasing the amount of an added catalyst.

The process of coating the coating solution in the present invention is not limited to any particular process, but may be any process such as a spin coating process, a spray coating process, a dip coating process, a screen printing process, gravure coating process, or the like insofar as the process is capable of coating the coating solution as a flat thin uniform film.

When the film coated on the substrate is heated at a temperature no less than 400° C., the metal ions as a coloring component are crystallized into an oxide, turning the coated film into a colored film. The temperature no less than 400° C. exceeds the polymerization completion temperature for the binder, and hence the binder forms a sufficiently dense matrix and is highly resistant to wear and chemicals. At a temperature less than 400° C., the metal ions are not crystallized sufficiently, making it difficult to produce a stable colored film. An upper limit for the heating temperature is determined by the temperature at which the substrate can withstand heat. If the substrate is made of soda lime glass, for example, then it can be heated to a temperature in the range of 650° C. to 700° C. When heated at such a higher temperature, the binder is made denser for increased wear and chemical resistance.

The coating solution is coated on the substrate and preliminarily fired at a temperature typically in the range of 200° C. to 300° C. Then the substrate is coated with a coating solution of the same type or coating solutions of various types. By repeating this process, it is possible to produce a glass plate with a light-transmissive colored film having a multiple-layer film structure. After the coating solution is coated and heated to form a colored film, a coating solution containing only a binder may be coated on the surface of the substrate, and similarly heated at a temperature no less than the polymerization completion temperature for the binder. In this manner, it is possible to produce a glass plate with a light-transmissive colored film which has better wear and chemical resistance.

BEST MODE FOR CARRIED OUT THE INVENTION

Examples of the present invention will be described in specific detail below. However, the scope of the present invention should not be interpreted as being limited to those examples.

Examples

Table 1 given below shows coating solution compositions and rotational speeds upon spin coating, of Examples 1–12 of the invention ("In. Ex.") and Comparative Examples 1–4 ("Co. Ex."). The coating solutions were prepared as follows:

To a mixed solution of 50 g of tetraethoxysilane (TEOS) (manufactured by Tama Kagaku Kogyo Kabushiki Kaisha) and 5 g of ethanol, there was added a mixed solution of 25 g of water, 8 g of ethanol, and 12 g of an aqueous solution of 5% nitric acid. The mixture was stirred. The molecular weight of the obtained silicate as converted to the molecular weight of polystyrene was Mw=2523 as measured by gel permeation chromatography (solution A).

The solution was aged to facilitate the polymerization reaction of the silicate. The molecular weight of the obtained silicate as converted to the molecular weight of polystyrene was Mw=85264 (solution B).

A metal salt (nitrate) as a coloring component was weighed to achieve the composition ratio shown in Table 1, and dissolved in a solvent 1 in Table 1 so that the metal ion concentration (metal ion concentration of the coloring component) would be 7 weight %. To the solution, there was added a binder (solution A or solution B) to achieve the composition ratio shown in Table 1. The solution was then diluted by a solvent 2 to achieve the metal ion concentration of the coloring component in the coating solution shown in Table 1. The solution was sufficiently stirred into a coating solution.

preliminarily fired at 300° C. for 30 minutes, and then fired at 650° C. for 2 minutes, whereupon a desired colored film was produced.

With respect to Example 13, the film was dried according to the above process using the coating solution shown for Example 13 in Table 1, and cooled to the room temperature. Then 15g of a coating solution prepared by diluting solution A with DAA until the concentration of $SiO_2$ was 1.5% was spin-coated on the dried film that was rotating at a rotational speed of 1000 rpm. The coated solution was dried at 300° C. for 30 minutes, and then fired at 650° C. for 2 minutes, whereupon a desired colored film was produced.

Evaluations of the produced films are shown in Table 2. Details of the evaluation process are as follows: The visible light transmittance and visible reflectance of each of the specimens were calculated according to JIS R 3106. The haze value of each of the specimens was measured by a hazemeter. The transmitted color and produced coloring of

TABLE 1

| Example | *1 | *2 | *3 | *4 | *5 | *6 | *7 |
|---------|------|-----------------------------|------|----------|----------|-----|------|
| In.Ex.1 | B | Cu:Mn:Co=3.0:2.2:1.1 | 0.25 | DMF[1)] | DMF | 3.8 | 1000 |
| In.Ex.2 | B | Cu:Mn:Co=3.0:2.2:1.1 | 0.36 | DMF | DMF | 3.8 | 1000 |
| In.Ex.3 | B | Cu:Mn:Co=3.0:2.2:1.1 | 0.50 | DMF | DMF | 3.8 | 1000 |
| In.Ex.4 | B | Cu:Mn:Co=3.0:2.2:1.1 | 0.36 | NMP[2)] | NMP | 3.6 | 1500 |
| In.Ex.5 | B | Cu:Mn:Co=3.5:1.8:1.5 | 0.36 | PEG#400[3)] | PEG#400 | 3.6 | 2000 |
| In.Ex.6 | B | Cu:Mn:Co=4.5:1.8:1.5 | 0.36 | DAA[4)] | DAA | 3.1 | 1000 |
| In.Ex.7 | B | Cu:Mn:Co=3.0:2.2:1.1 | 0.36 | TEG[5)] | TEG | 3.6 | 1000 |
| In.Ex.8 | B | Cu:Mn:Co=3.0:2.2:1.1 | 0.36 | PG[6)] | DMF | 3.6 | 1000 |
| In.Ex.9 | B | Cu:Mn:Fe=5.0:2.0:1.0 | 0.36 | PEG#400 | PEG#400 | 3.6 | 1500 |
| In.Ex.10 | B | Cu:Mn:Ru=5.0:2.0:0.5 | 0.36 | PEG#400 | PEG#400 | 3.6 | 1500 |
| In.Ex.11 | B | Cu:Mn:Ni=3.0:3.0:0.8 | 0.36 | PEG#400 | PEG#400 | 3.6 | 1500 |
| In.Ex.12 | B | Cu:Mn:Fe:Al=3.0:1.5:0.5:0.5 | 0.36 | PEG#400 | PEG#400 | 3.6 | 1500 |
| In.Ex.13 | B | Cu:Mn:Co=3.0:2.2:1.1 | 0.25 | DMF | DMF | 3.8 | 1000 |
| Co.Ex.1 | A | Cu:Mn:Co=3.0:2.2:1.1 | 0.12 | DMF | DMF | 3.8 | 1000 |
| Co.Ex.2 | A | Cu:Mn:Co=3.0:2.2:1.1 | 0.36 | DMF | DMF | 3.8 | 1000 |
| Co.Ex.3 | A | Cu:Mn:Co=3.0:2.2:1.1 | 0.50 | DMF | DMF | 3.8 | 1000 |
| Co.Ex.4 | None | Cu:Mn:Co=3.0:2.2:1.1 | 0.36 | DMF | DMF | 3.8 | 1000 |

*1: Binder solution
*2: Ion ratio of coloring metals (weight ratio)
*3: Metal ion ratio
*4: Solvent 1
*5: Solvent 2
*6: Coloring ion (weight %)
*7: Rotational speed (rpm)
1) DMF: N,N-dimethylformamide
2) NMP: N-methyl-2-pyrrolidone
3) PEG#400: polyethylene glycol (average molecular weight 400)
4) DAA: diacetone alcohol
5) TEG: tetraethylene glycol
6) PG: propylene glycol 15 g of the solution was dropped from a beaker onto a substrate of soda lime glass that had a size of 150 mm×150 mm×2 mm and was rotating at the rotational speed shown in Table 1. After spinning off the dropped solution for 1 minute, the substrate was stopped. The coated substrate was then each of the specimens were visually observed for uniformity (color irregularity and discoloration tendency). The wear strength of each of the specimens was tested by a Taber abrasion test (truck wheel: CS10-F, load: 500 g, number of revolutions: 500) to measure haze differences and visible transmittance differences between the time before the specimens were worn and the time after the specimens were worn. The specimens with a difference of ± 3 or less were marked with ⊙, the specimens with a difference of ± 15 or less with ○, and the specimens with a difference of ± 16 or greater were marked with x. The chemical resistance of the films was measured by immersing the films in 0.1N $H_2SO_4$ and 0.1N NaOH for 2 hours to measure visible transmittance differences between the time before the specimens were immersed and the time after the specimens were immersed. The specimens with a difference of ± 2% or less were marked with ⊙, and the specimens with a difference of ± 3 or greater were marked with x.

TABLE 2

| Example | *1 | *2 | *3 | *4 | *5 *6 | *5 *7 | *8 | *9 $H_2SO_4$ | *9 NaOH |
|---|---|---|---|---|---|---|---|---|---|
| In.Ex.1 | 29 | 21 | 0.3 | Black | None | None | ○ | ⊙ | ⊙ |
| In.Ex.2 | 31 | 8 | 0.1 | Black | None | None | ⊙ | ⊙ | ⊙ |
| In.Ex.3 | 36 | 6 | 0.2 | Black | None | None | ⊙ | ⊙ | ⊙ |
| In.Ex.4 | 38 | 8 | 0.2 | Black | None | None | ⊙ | ⊙ | ⊙ |
| In.Ex.5 | 36 | 8 | 0.2 | Black | None | None | ⊙ | ⊙ | ⊙ |
| In.Ex.6 | 35 | 7 | 0.3 | Black | None | None | ⊙ | ⊙ | ⊙ |
| In.Ex.7 | 34 | 7 | 0.1 | Black | None | None | ⊙ | ⊙ | ⊙ |
| In.Ex.8 | 30 | 7 | 0.3 | Black | None | None | ⊙ | ⊙ | ⊙ |
| In.Ex.9 | 32 | 8 | 0.3 | Black | None | None | ⊙ | ⊙ | ⊙ |
| In.Ex.10 | 36 | 9 | 0.2 | Black | None | None | ⊙ | ⊙ | ⊙ |
| In.Ex.11 | 43 | 9 | 0.3 | Black | None | None | ⊙ | ⊙ | ⊙ |
| In.Ex.12 | 40 | 8 | 0.2 | Brown | None | None | ⊙ | ⊙ | ⊙ |
| In.Ex.13 | 30 | 12 | 0.2 | Black | None | None | ⊙ | ⊙ | ⊙ |
| Co.Ex.1 | 31 | 18 | 0.2 | Black | None | None | x | ⊙ | ⊙ |
| Co.Ex.2 | 58 | 11 | 0.3 | YB/B# | Much | Y## | — | — | — |
| Co.Ex.3 | 62 | 14 | 0.3 | YB/B# | Much | Y## | — | — | — |
| Co.Ex.4 | 29 | 28 | 0.1 | Black | None | None | x | x | x |

*1: Transmittance (%)
*2: Reflectance (%)
*3: Haze (%)
*4: Transmitted color
*5: Coloring uniformity
*6: Color irregularity
*7: Discoloration
*8: Wear strength
*9: Chemical resistance
YB/B#: Yellowish Brown/Black
Y##: Yellow increased It was found from the results of Examples 1–13 shown in Table 2 that a colored film could easily be formed by coating a substrate with a coating solution comprising salts of Cu and Mn, a salt of at least one metal selected from Fe, Ru, Co, Ni and Al, a solvent, and a binder.

As can be seen from the results of Inventive Examples 1, 2, 3, 4 shown in Table 2, the wear strength of the film was increased by increasing the concentration of the binder. If the concentration of the binder was low as with Comparative Example 1, or no binder was added as with Comparative Example 4, the wear strength and chemical resistance of the film were low.

It can be seen from the results of Examples 1, 2, 3 and Comparative Examples 2, 3 that when the molecular weight of the binder was increased, stable coloring was achieved and durability was increased even if the concentration of the binder was increased.

It can be seen from the results of Example 13 that the wear strength and chemical resistance of the film were further increased by covering the colored film with the $SiO_2$ film.

The glass plate with a light-transmissive colored film produced by the method according to claim 4 of the present invention has the following structure.

The colored film includes a metal oxide as a coloring component dispersed in a vitrified film produced according to a sol-gel process from the starting material of a metal alkoxide which comprises at least one material selected from the alkoxides of Si, Ti, Al, and Zr.

The metal oxide constitutes a composite oxide substantially represented by Cu.Mn$x$.M$y$.O$z$ (M indicates at least one metal selected from Ru, Fe, Ni and Al) where x, y, z are in the ranges of $0.8 \leq x \leq 1.2$, $0.8 \leq y \leq 1.2$, $3 \leq z \leq 5$, respectively.

Furthermore, the composite oxide comprises a spinel-type oxide represented by $Cu_{1.5}$ $(Mn,M)_{1.5}O_4$ (M indicates at least one metal selected from Fe, Ru, Co, Ni and Al).

Alternatively, the composite oxide may be substantially represented by Cu.Mn$x$.Co$y$.O$z$ where x, y, z are in the ranges of $0.3 \leq x \leq 1.2$, $0.3 \leq y \leq 1.2$, $2 \leq z \leq 4$, respectively.

The film is made of $SiO_2$ and the weight ratio of $SiO_2$ to the composite oxide is in the range of 20 to 90%.

The film has a thickness in the range of 100–300 nm.

The film has a sheet resistance no less than 10 MΩ/square.

The glass plate with a light-transmissive colored film should preferably have the following optical characteristics:

The glass plate has a visible light transmittance of 50% or more. The surface of the glass plate on which the thin film is formed has a visible light transmittance of 15% or less. A color tone reflected by the surface of the glass plate on which the thin film is present has a and b values each in the range of −5 to 5 represented by Lab Hunter chromaticity coordinates.

INDUSTRIAL APPLICABILITY

As indicated by the above examples, it is possible to manufacture a glass plate with a light-transmissive colored film easily and inexpensively according to the method of the present invention. Since the glass plate with a light-transmissive colored film has excellent durability, it is highly useful in industrial applications.

We claim:

1. A method of manufacturing a glass plate with a light-transmissive colored film, comprising the steps of:
   (1) hydrolyzing and polymerizing a silicate to form a hydrolyzed polymeric product;
   (2) aging said hydrolyzed polymeric product to achieve a weight-average molecular weight no less than 80000 based on polystyrene;
   (3) preparing a coating solution comprising the aged hydrolyzed polymeric product, a metal salt as a coloring component, and a solvent;
   (4) coating said coating solution on a surface of a glass plate;
   (5) preliminarily firing the glass plate to convert said hydrolyzed polymeric product into a porous gel; and
   (6) firing the glass plate to vitrify said porous gel and thermally decompose said metal salt into a metal oxide wherein the coated glass plate has a visible light transmittance of 50% or more.

2. A method according to claim 1, wherein step (5) is carried out at a temperature of no more than 300° C.

3. A method according to claim 1, wherein step (6) is carried out at a temperature of no more than the softening point of the glass plate.

4. A method according to claim 1 wherein the metal salt comprises salts of Cu and Mn and a salt of at least one metal selected from Fe, Ru, Co, Ni and Al.

5. A method according to claim 1 wherein after step (4) the glass plate is coated with a solution containing at least one metal alkoxide selected from the alkoxides of Si, Ti, Al and Zr and from which solution a coloring component is substantially absent; the coated solution is dried; and the glass plate is fired thereafter and wherein the glass plate having a light-transmissive colored film has improved wear and chemical resistance.

6. A method according to claim 4, wherein said colored film includes said metal oxide as the coloring component dispersed in a vitrified film produced by a sol-gel process from a starting material comprising said silicate.

7. A method according to claim 6, wherein the metal oxide comprises a composite oxide substantially represented by $Cu.Mn_x.M_y.O_Z$ in which M indicates at least one metal selected from the group consisting of Ru, Fe, Ni and Al, and x, y and z are in the ranges of $0.8 \leq x \leq 1.2$, $0.8 \leq y \leq 1.2$, $3 \leq z5$, respectively.

8. A method according to claim 6, wherein the metal oxide comprises a composite oxide of a spinel-type oxide substantially represented by $Cu_{1.5}(Mn,M)_{1.5}O_4$ in which M indicates at least one metal selected from the group consisting of Fe, Ru, Co, Ni and Al.

9. A method according to claim 6, wherein the metal oxide comprises a composite oxide substantially represented by $Cu.Mn_x.Co_y.O_z$, in which x, y and z are in the ranges of $0.3 \leq x \leq 1.2$, $0.3 \leq y \leq 1.2$, $2 \leq z \leq 4$, respectively.

10. A method according to claim 7, wherein the film is made of $SiO_2$ and the weight ratio of $SiO_2$ to the composite oxide is in the range of 20 to 90%.

11. A method according to claim 8, wherein the film is made of $SiO_2$ and the weight ratio of $SiO_2$ to the composite oxide is in the range of 20 to 90%.

12. A method according to claim 9, wherein the film is made of $SiO_2$ and the weight ratio of $SiO_2$ to the composite oxide is in the range of 20 to 90%.

13. A method according to claim 6, wherein the film has a thickness in the range of 100–300 nm.

14. A method according to claim 6, wherein the film has a sheet resistance no less than 10 M$\Omega$/square.

15. A method according to claim 6, wherein the glass plate has a visible light transmittance of 50% or more, the surface of the glass plate on which the thin film is formed has a visible light transmittance of 15% or less, and a color tone reflected by the surface of the glass plate on which the thin film is present has a and b values each in the range of –5 to 5 as represented by Lab Hunter chromaticity coordinates.

* * * * *